(12) United States Patent
Durak et al.

(10) Patent No.: US 10,245,997 B2
(45) Date of Patent: *Apr. 2, 2019

(54) RADIO FREQUENCY ID TAG POSITIONING SYSTEM FOR COMPRESSED-GAS TANKS

(71) Applicant: Bauer Compressors, Inc., Norfolk, VA (US)

(72) Inventors: Tahsin Durak, Norfolk, VA (US); Michael R. Sayre, Virginia Beach, VA (US)

(73) Assignee: BAUER COMPRESSORS, INC., Norfolk, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,486

(22) Filed: Jul. 16, 2018

(65) Prior Publication Data

US 2018/0354402 A1 Dec. 13, 2018

Related U.S. Application Data

(62) Division of application No. 15/619,746, filed on Jun. 12, 2017.

(51) Int. Cl.
| | | |
|---|---|---|
| *B60P 3/22* | (2006.01) | |
| *G06K 7/10* | (2006.01) | |
| *G06K 19/07* | (2006.01) | |
| *G06K 19/04* | (2006.01) | |
| *G06K 19/077* | (2006.01) | |
| *G08C 17/02* | (2006.01) | |

(52) U.S. Cl.
CPC .............. *B60P 3/228* (2013.01); *B60P 3/227* (2013.01); *G06K 7/10178* (2013.01); *G06K 19/04* (2013.01); *G06K 19/0726* (2013.01); *G06K 19/07758* (2013.01); *B60P 3/2215* (2013.01); *G08C 17/02* (2013.01)

(58) Field of Classification Search
CPC .......... G08C 17/02; B60P 3/228; B60P 3/227; B60P 3/2215; G06K 19/0726; G06K 7/10178; G07G 1/009
See application file for complete search history.

(56) References Cited

U.S. PATENT DOCUMENTS

| | | | |
|---|---|---|---|
| 6,486,782 B1 * | 11/2002 | Zarembo | G08B 13/2417 340/572.1 |
| 7,429,926 B1 * | 9/2008 | Drimer | G06K 19/07758 340/10.51 |
| 9,619,678 B2 * | 4/2017 | Morris | G06K 19/07762 |
| 10,093,218 B2 * | 10/2018 | Durak | G06K 7/10178 |
| 2003/0052788 A1 * | 3/2003 | Kwong-Tai Chung | G06K 7/10346 340/573.1 |

(Continued)

*Primary Examiner* — Thomas D Alunkal
(74) *Attorney, Agent, or Firm* — Peter J. Van Bergen (57) ABSTRACT

A radio frequency identification (RFID) tag positioning system includes a tag holder having a first region with a slot extending from an edge of the first region, and a second region extending from the first region. When an RFID tag having an antenna is disposed in the slot of the tag holder and when the tag holder is adapted to be retained adjacent a filling fixture of a gas tank with the second region adapted to be in contact with the gas tank so that the slot is approximately perpendicular to a longitudinal axis of the gas tank, the RFID tag's antenna is approximately perpendicular to the longitudinal axis of the gas tank.

11 Claims, 6 Drawing Sheets

(56) References Cited

U.S. PATENT DOCUMENTS

| | | | | |
|---|---|---|---|---|
| 2004/0074974 | A1* | 4/2004 | Senba | G06K 7/10336 |
| | | | | 235/492 |
| 2007/0257857 | A1* | 11/2007 | Marino | G06K 7/10336 |
| | | | | 343/867 |
| 2008/0048834 | A1* | 2/2008 | Lenevez | H01Q 7/00 |
| | | | | 340/10.3 |
| 2008/0122704 | A1* | 5/2008 | King | G06K 19/07749 |
| | | | | 343/702 |
| 2009/0194526 | A1* | 8/2009 | Buchanan | H05B 6/062 |
| | | | | 219/600 |
| 2013/0126611 | A1* | 5/2013 | Kangas | G07G 1/009 |
| | | | | 235/385 |

* cited by examiner

RADIO FREQUENCY ID TAG POSITIONING SYSTEM FOR COMPRESSED-GAS TANKS

This is a divisional application of U.S. Pat. No. 10,093, 218, formerly application Ser. No. 15/619,746, "TANK SUPPORT SYSTEM INCORPORATING TANK IDENTIFICATION", filed on Jun. 12, 2017.

FIELD OF THE INVENTION

The invention relates generally to radio frequency identification (RFID) tag positioning systems, and more particularly to an RFID tag positioning system for use with a compressed-gas tank.

BACKGROUND OF THE INVENTION

Tanks that store compressed gas are used in a variety of commercial, industrial, recreational, governmental, and healthcare applications and environments. In almost all cases, the tanks are refillable and reusable over the course of their useful life. Regardless of the type of tank and the gas it is intended to store, compressed-gas tanks are subject to a variety of regulations governing tank identification, use, and safety issues.

Traditionally, the filling or refilling of reusable compressed-gas tanks was a manual operation prone to operator error as well as being inherently dangerous to a refilling operator. More recently, "radio frequency identification" (RFID) tags have been affixed to tanks to help identify important information related to the tank, e.g., the tank's identification, purpose, owner, minimum/maximum fill pressures, tank filling parameters, operating pressures, type of gas the tank is designed to store, storage environment information/regulations, tank test and/or certification dates, tank end-of-life date, etc. Typically, the RFID tag is read prior to some type of manual or automated filling operation. The information read from the RFID tag is used to improve the efficiency and safety associated with the filling operation.

In terms of compressed-gas tank filling operations, conventional RFID tag reading operations introduce efficiency problems and can introduce safety concerns. With respect to efficiency, RFID tag reading relies on proper manual movement/positioning of a manually-manipulated RFID reader, or a properly positioned fixed-location RFID reader. At a minimum, improper RFID reader positioning leads to delays in a tank refilling operation. To combat this issue, higher-power RFID readers (e.g., on the order of 2 watts or more) are relied upon to reduce the reader's sensitivity to reader-to-tag positioning. Unfortunately, the use of higher-power RFID readers introduces potential safety issues.

In terms of safety, it is relevant that most compressed-gas tank-filling operations involve the presence of numerous tanks in an environment equipped to perform the tank filling operations. In these multi-tank environments, when operators rely on higher-power RFID readers (e.g., on the order of 2 watts or more) to reduce RFID positioning concerns relative to an RFID tag as described above, crosstalk between nearby RFID tags can cause incorrect tag-to-tank associations that are subsequently relied upon by a filling operator or an automated filling machine. When this type of error occurs in either a manual or automated tank filling operation, the results can be disastrous as a refilling operator/machine relies on the information it receives from its reader to institute a tank filling operation. That is, an incorrect tag-to-tank association can cause a tank to be over or under pressurized, can cause an out-of-certification tank to be filled, etc. Furthermore, higher-power RFID readers can generate error warnings when operated near electrically-conductive structures. At a minimum, the generation of such error warnings affects the efficiency of a tank filling operation.

SUMMARY OF THE INVENTION

Accordingly, it is an object of the present invention to improve the safety and efficiency of compressed-gas tank filling operations.

Other objects and advantages of the present invention will become more obvious hereinafter in the specification and drawings.

In accordance with the present invention, a radio frequency identification (RFID) tag positioning system includes a tag holder transparent to electromagnetic energy. The tag holder includes a first region having a slot extending from an edge of the first region, and a second region extending from the first region. When an RFID tag having an antenna is disposed in the slot of the tag holder and when the tag holder is adapted to be retained adjacent a filling fixture of a gas tank with the second region adapted to be in contact with the gas tank so that the slot is approximately perpendicular to a longitudinal axis of the gas tank, the RFID tag's antenna is approximately perpendicular to the longitudinal axis of the gas tank.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
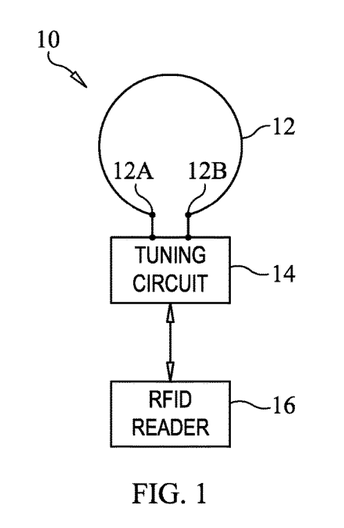
FIG. 1 is an isolated schematic view of an RFID antenna system for use in a compressed-gas tank filling machine's containment system in accordance with an embodiment of the present invention.

Referring now to the drawings and more particularly to FIG. 1, an RFID antenna system for use in a compressed-gas tank filling machine's tank support system is shown and is referenced generally by numeral 10. As will be explained further below, antenna system 10 can be used to read a variety of types of RFID tags. Furthermore, antenna system 10 assures that only an intended RFID tag is read and can be a low-power system to eliminate the possibility of crosstalk from any other nearby RFID tag. Note that antenna system 10 can also be configured to write to an RFID tag without departing form the scope of the present invention.

Antenna system 10 includes a loop antenna 12, a tuning circuit 14, and an RFID reader 16. In general, loop antenna 12 is an electrically-conductive element shaped to define a substantially complete loop terminating in antenna feed points 12A and 12B. The geometric shape traced by loop antenna 12 can be circular, oval, rectangular, etc., without departing from the scope of the present invention. By way of example and for purpose of using antenna system 10 in a compressed-gas tank filling machine, loop antenna 12 will be assumed to trace a circular geometric shape for reasons that will be explained further below. Tuning circuit 14 is an adjustable device that, when coupled to antenna feed points 12A and 12B, allows the electrical impedance of loop antenna 12 to be tuned to match that of RFID reader 16. RFID reader 16 is electrically coupled to loop antenna 12 for two-way communication therewith via tuning circuit 14. RFID reader 16 can be any commercially-available or specially-designed RFID tag-reading device without departing from the scope of the present invention. Such RFID readers are well understood in the art and will, therefore, not be described further herein.

Figure 2:
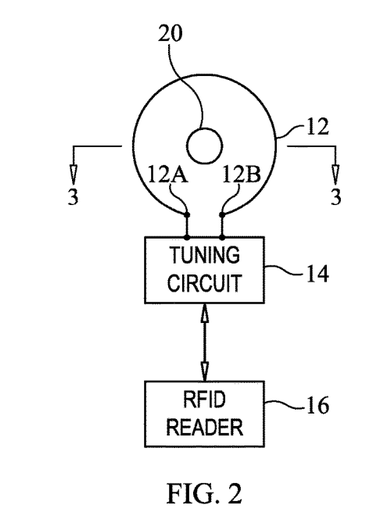
FIG. 2 is a schematic plan view of an RFID antenna system with an RFID tag disposed within the loop region defined within the system's loop antenna.
Figure 3:
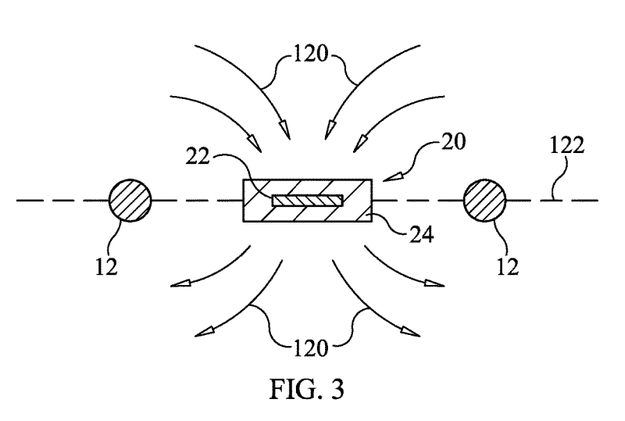
FIG. 3 is a cross-sectional view of the loop antenna and RFID tag taken along line 3-3 in FIG. 2 illustrating the antenna's reading field lines.

Antenna system 10 avoids or eliminates the above-described location-sensitivity, high-power, and crosstalk problems associated with the reading of RFID tags in a compressed-gas tank filling environment. To better explain how antenna system 10 overcomes these various RFID tag reading problems, reference will now be made to FIGS. 2 and 3 where an RFID tag 20 is positioned within the confines of loop antenna 12. The cross-sectional geometry of loop antenna 12 can be circular as shown in FIG. 3. However, it is to be understood that the cross-sectional geometry of loop antenna 12 could be other regular or irregular-shaped geometries without departing form the scope of the present invention.

As is known in the art of RFID technology, all RFID tags include a planar antenna that is most effectively interrogated or read when the field lines of a reading system's antenna are perpendicular to the plane of the planar antenna. In the illustrated embodiment, it will be assumed that a planar antenna 22 is embedded within a non-electrically-conducting material casing 24 of RFID tag 20 shown in FIG. 3. In accordance with the present invention, the field lines of loop antenna 12 are indicated by field lines 120 in FIG. 3 when RFID reader 16 is operated to read RFID tag 20. Field lines 120 will be perpendicular or substantially perpendicular to planar antenna 22 when RFID tag 20 is positioned such that planar antenna 22 is either aligned with the plane 122 defined by antenna loop 12, is parallel to plane 122 but still within field lines 120, or is canted at a small angle (e.g., approximately 15 degrees or less) relative to plane 122 but still within field lines 120.

Figure 4:
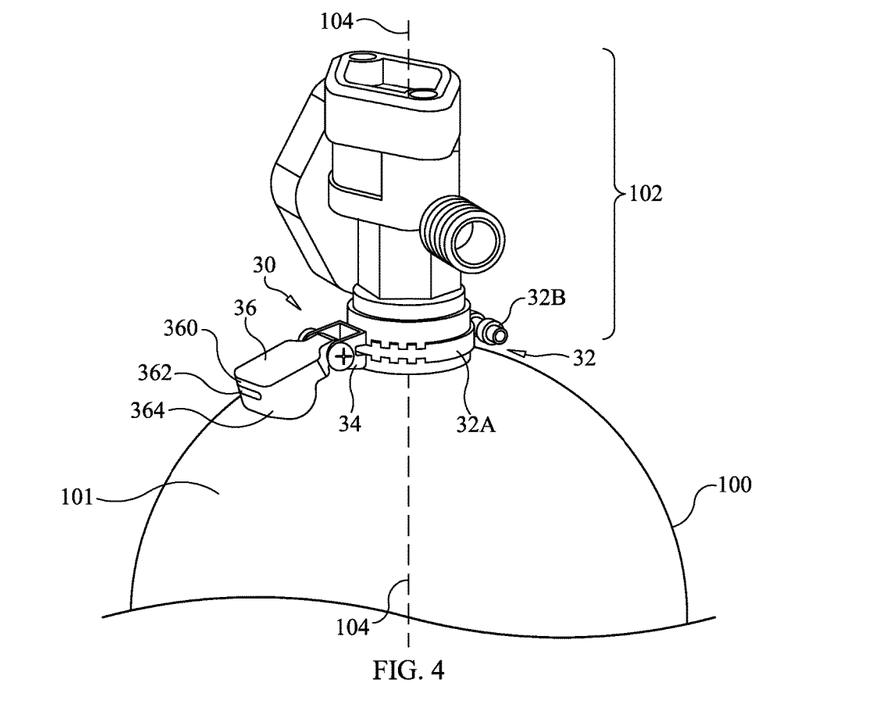
FIG. 4 is a perspective view of the top portion of a compressed-gas tank illustrating a perspective view of an RFID tag positioner in accordance with an embodiment of the present invention.

When the above-described RFID antenna system and RFID tag are to be incorporated into a compressed-gas tank filling machine/operation, the present invention can include a novel positioning holder to hold RFID tag 20 in a position/orientation that assures the above-described relationship between the loop antenna's field lines and the RFID tag's planar antenna. For example and with reference to FIG. 4 where the top portion of a compressed-gas tank 100 (e.g., a SCBA cylinder) is illustrated, an RFID tag positioner 30 is coupled to tank 100 at its valve fixture 102, the design of which is not a limitation of the present invention. Briefly, tag positioner 30 includes an attaching collar 32 coupled to tank 100, a locking bracket 34 coupled to collar 32, and an RFID tag supporting holder 36 coupled to locking bracket 34 (e.g., via a screw attachment thereto. Collar 32 can include an adjustable-length strap 32A tightened about valve fixture 102 by a screw clamp 32B.

Figure 5:
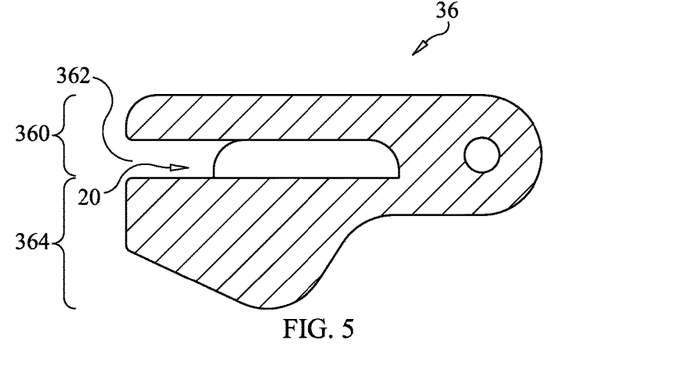
FIG. 5 is an isolated cross-sectional view of the RFID tag holder in accordance with an embodiment of the present invention.

Additional and simultaneous reference will now be made to FIG. 5 where supporting holder 36 is shown in an isolated cross-sectional view thereof. Supporting holder 36 is made from an electromagnetic (EM) energy transparent material(s) (e.g., rubber, fiberglass, plastic, wood, cloth, and combinations thereof). Supporting holder 36 is configured to support an RFID tag 20 therein. When supporting holder 36 with RFID tag 20 therein is included in a tag positioner 30 attached to a valve fixture 102 of a tank 100, RFID tag 20 will be placed in an orientation that positions the plane of the planar antenna of the RFID tag in a perpendicular or near perpendicular orientation relative to the longitudinal axis 104 of tank 100. More specifically, supporting holder 36 includes a tag housing region 360 and a tag positioning leg 364. Tag housing region 360 includes a slot 362 that provides for the insertion of an RFID tag 20 therein such that it is captured within tag housing region 360. Once RFID tag 20 has been inserted into slot 362, the opening of slot 362 can be sealed. When a tag positioner 30 (inclusive of supporting holder 36 and RFID tag 20) is attached to valve fixture 102, positioning leg 364 places slot 362 (and the antenna of RFID tag 20 positioned therein) perpendicular (or nearly perpendicular) to the tank's longitudinal axis 104 at the crown region of tank 100.

Figure 6:
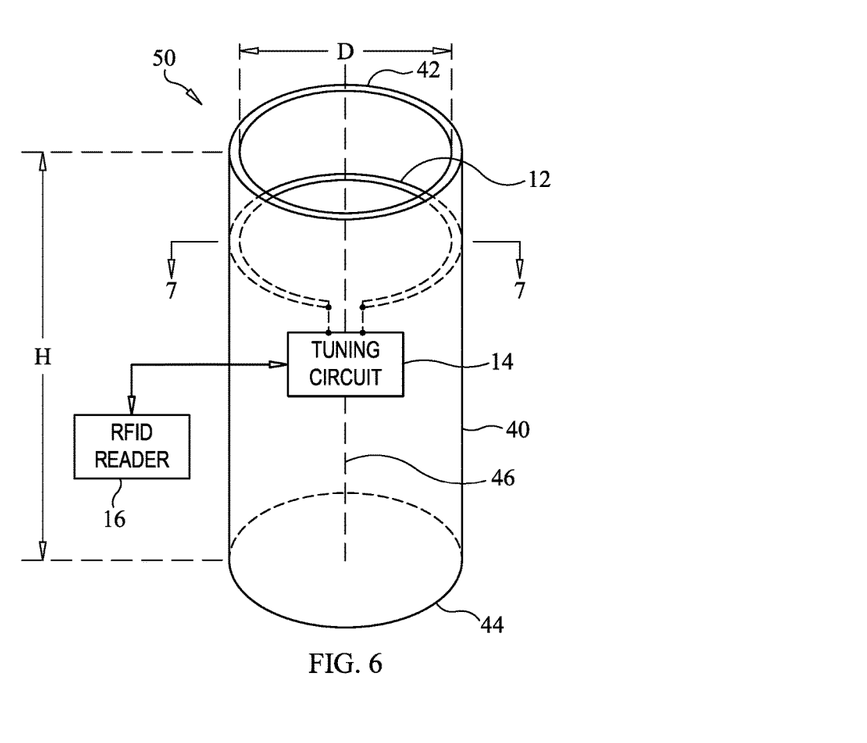
FIG. 6 is a part side and part schematic view of an RFID-based tank support system for a compressed-gas tank filling machine in accordance with an embodiment of the present invention.
Figure 7:
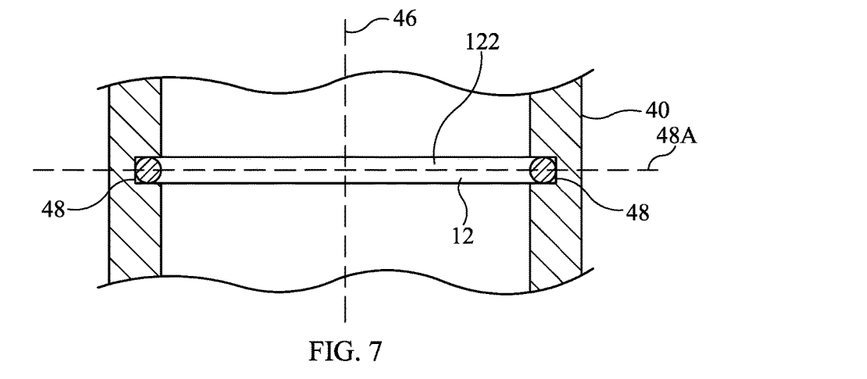
FIG. 7 is an enlarged cross-sectional view of a portion of the tank container and antenna taken along line 7-7 in FIG. 6.

As previously mentioned, the above-described antenna system can be included as part of an RFID-based tank support system for a compressed-gas tank filling machine as will now be described with simultaneous reference to FIGS. 6 and 7. FIG. 6 illustrates an embodiment of an RFID-based tank support system 50 for a compressed-gas tank filling machine (not shown), and FIG. 7 is a cross-sectional view of the system's container 40 taken along line 7-7 in FIG. 6.

Tank support system 50 provides mechanical support for a compressed-gas tank or cylinder (not shown) during a tank filling operation, while simultaneously providing for the reading of an RFID tag coupled to the tank. For example, the RFID tag could be RFID tag 20 held in place using tag positioner 30 as described above with reference to FIG. 4. Tank support system 50 includes a hollow container 40 having an open (top) end 42 and a closed (bottom) end 44, as well as previously-described loop antenna 12, tuning circuit 14, and RFID reader 16. Container 40 can be a circular cylinder having an inside diameter "D" sufficient to provide for the loading of a compressed-gas tank. The length or height "H" of container 40 should be sufficient to substantially or fully contain a compressed-gas tank loaded therein.

Positioned near open top 42 of container 40 is loop antenna 12. In general, loop antenna 12 is coupled to the sidewall region of container 40 with its loop plane perpendicular to the longitudinal axis 46 of container 40. Thus, for a container 40 that is a circular cylinder, loop antenna 12 is a circular loop antenna. Loop antenna 12 is positioned at a location along the length of container 40 that is approximately commensurate with the above-described crown region of a compressed-gas tank when such a tank is in container 40. For example, when the above-described tag positioner 30 and RFID tag 20 are to be used in combination for a particular type of tank that is to be serviced by tank support system 50, loop antenna 12 can be positioned along container such that its plane 122 will be approximately aligned with the portion of a tank at which tag positioner 30 positions a captured RFIG tag as described above and as illustrated in FIG. 8.

Figure 8:
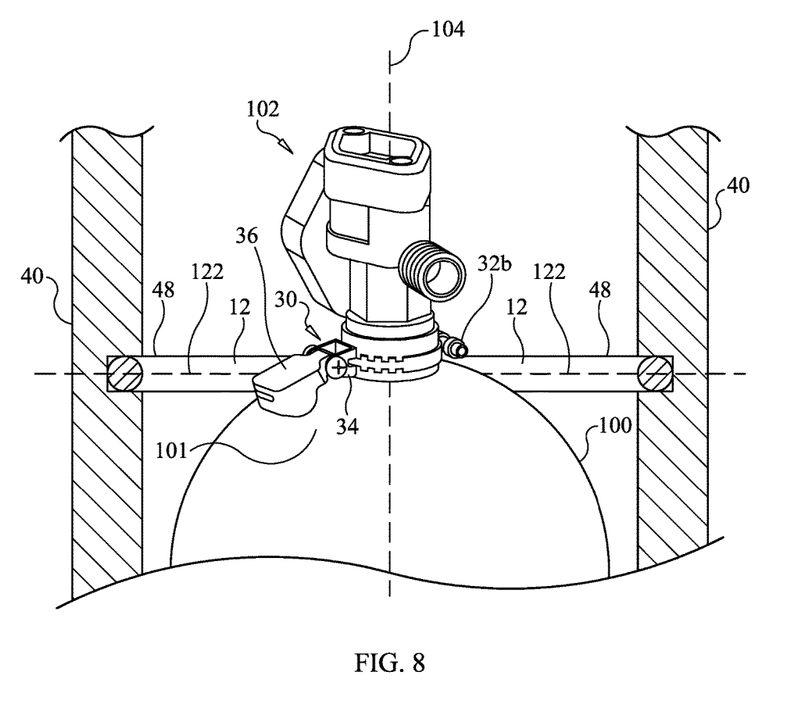
FIG. 8 is a cross-sectional view of a portion of a tank container illustrating the relationship between the container's loop antenna and an RFID tag poisoner attached to a compressed-gas tank in accordance with an embodiment of the present invention.

Container 40 can serve as the mechanical support for the geometric shape of loop antenna 12. For example, when container 40 is a circular cylinder, container 40 can readily provide the mechanical support for a circular geometric shape of loop antenna 12. The loop antenna can be an electrically-conductive wire, flat strip, etc., mounted on the inside surface of container 40, embedded fully or partially within the walls container 40, or mounted on the outside surface of container 40 without departing from the scope of the present invention. For example, in the embodiment illustrated in FIG. 7, loop antenna 12 resides in an inward-facing and contiguous annular notch 48 defined in the sidewall of container 40 to thereby support and protect loop antenna 12. Notch 48 lies in a plane 48A that is perpendicular to longitudinal axis 46 of container 40 to thereby assure perpendicularity between plane 122 of loop antenna 12 and longitudinal axis 104 of a tank 100 that is to be placed in container 40 as illustrated in FIG. 8.

Tuning circuit 14 is electrically coupled to loop antenna 12 and can be mounted on container 40 to facilitate its usage. Another advantage of mounting tuning circuit 14 on container 40 is that tank support system 50 can be readily and accurately tuned in a factory environment thereby allowing it to function as a "plug in" module of a compressed-gas tank filling machine. RFID reader 16 can be mounted on container 40 or located near container 40 without departing from the scope of the present invention. Container 40 can be made completely of one or more non-magnetic, non-electrically-conducting material(s) to prevent any interference with the reading field of loop antenna 12. At a minimum, container 40 should exhibit non-magnetic and non-conducting properties in the vicinity of the reading field of loop antenna 12. For example, suitable materials for container 40 include, but are not limited to, rubber, fiberglass, plastic, wood, cloth, and combinations thereof.

Figure 9:
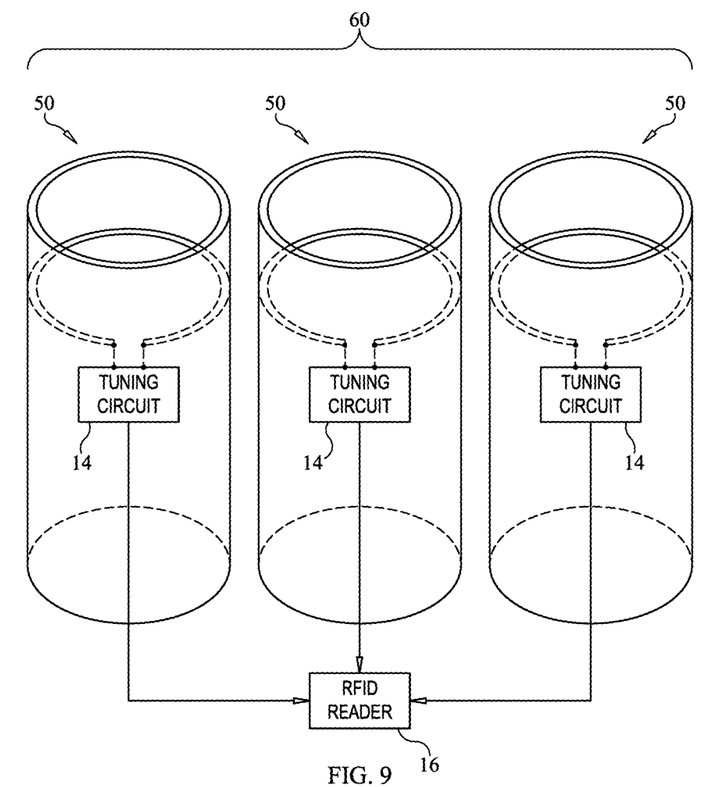
FIG. 9 is a part side and part schematic view of a multiple-container RFID-based tank support system in accordance with another embodiment of the present invention.

Tank support system 50 employing the loop antenna-based RFID tag reading system as described herein reduces the power requirements needed to accurately read an RFID tag on a compressed-gas tank positioned in the system's container 40. Typical power output of the RFID reader need only be on the order of 1 watt or less. At such low power levels, tank support system 50 will not be subject to crosstalk interference from any other nearby RFID tags not in container 40. Furthermore, the low-power and no crosstalk features and advantages of tank support system 50 make it an ideal candidate for clustering in a multiple container tank filling machine. For example and with reference to FIG. 9, a multiple-container RFID-based tank support system 60 uses a plurality of tank support systems 50 in a side-by-side arrangement. While three tank support systems 50 are illustrated, more or fewer could be used without departing from the scope of the present invention. All tank support systems 50 can be coupled to a single RFID reader 16 (as shown), or each tank support system 50 could have its own dedicated RFID reader coupled thereto without departing form the scope of the present invention.

Figure 10:
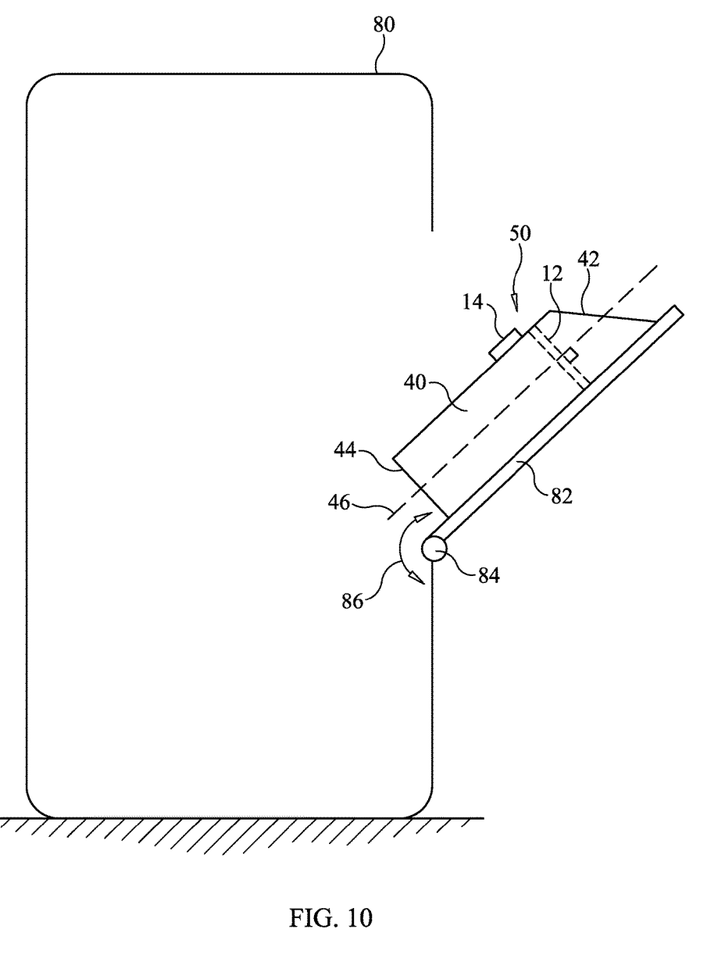
FIG. 10 is a side view of a compressed-gas tank filling machine illustrating the tank support system of the present invention incorporated into a door of the filling machine.

A single tank support system 50 or multiple-container tank support system 60 can be incorporated into an automated compressed-gas tank filling machine. For example and with reference to FIG. 10, a compressed-gas tank filling machine 80 is shown with the tank support system's supporting door open and indicated by reference numeral 82. Door 82 is coupled to machine 80 by a hinge 84 that allows door 82 to rotate into or out of machine 82 as indicated by two-headed arrow 86. It is to be understood that machine 80 includes numerous other mechanical and electrical elements/systems omitted from FIG. 10 for clarity of illustration. Mounted on door 82 is one (or more) tank support system 50. Open top 42 of container 40 can be angled as shown to facilitate the insertion/removal of a compressed-gas tank and/or the opening/closing of door 82.

In use, an operator would load a compressed gas tank into container 40 and couple the tank filling equipment (not shown) thereto. The tank can have an RFID tag positioner (not shown) coupled thereto as described above and as shown in FIG. 4. Door 82 could then be rotated towards machine 80 such that containment system 50 is fully within machine 80. Reading of the RFID tag associated with a tank in tank support system 50 can then be commenced and the read information can be used by machine 80 to properly fill (or prevent the filling of) a tank in tank support system 50.

The advantages of the present invention are numerous. The tank support system incorporating tank identification as described herein will accurately read just the intended RFID tag coupled to a gas tank in the tank support system. The system's ability to use low-power RFID readers allows multiple tank support systems to be clustered together without any crosstalk concerns. Furthermore, since the system's antenna is sensitive to RFID tags that only lie within the confines of the antenna's loop and since the antenna can operate a low power levels on the order of 1 watt, the antenna is not affected by nearby electrically-conductive structures located outside of the antenna loop's perimeter. Use of the tag positioner on a tank further assures optimum RFID tag placement for efficient and accurate reading of an RFID tag. Thus, the tank support system described herein is an ideal candidate for incorporation into a compressed-gas tank filling machine that typically includes a large amount of electrically-conductive structural materials. For all of the above reasons, the invention described herein will greatly improve the efficiency and safety of compressed-gas tank filling operations.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A radio frequency identification (RFID) tag positioning system, comprising:

a collar adapted to be coupled to a filling fixture on a gas tank wherein the filling fixture is aligned with a longitudinal axis of the gas tank; and a tag holder coupled to said collar, said tag holder being transparent to electromagnetic energy, said tag holder including a first region having a slot extending from an edge of said first region, said tag holder including a second region extending from said first region, said second region including a positioning leg wherein, when said collar with said tag holder coupled thereto is coupled to the filling fixture such that said positioning leg of said tag holder is adapted to be in contact with the gas tank, said slot is approximately perpendicular to the longitudinal axis of the gas tank.

2. An RFID tag positioning system as in claim 1, further comprising an RFID tag disposed in said slot of said tag holder.

3. An RFID tag positioning system as in claim 1, wherein said collar is adjustable in size.

4. An RFID tag positioning system as in claim 1, wherein said tag holder comprises a material selected from the group consisting of rubber, fiberglass, plastics, wood, cloth, and combinations thereof.

5. A radio frequency identification (RFID) tag positioning system, comprising:

an adjustable length strap adapted to be coupled to a gas tank having a longitudinal axis; and a tag holder coupled to said strap, said tag holder being transparent to electromagnetic energy, said tag holder including a first region having a slot extending from an edge of said first region, said tag holder including a second region extending from said first region, said second region including a positioning leg wherein, when said strap with said tag holder coupled thereto is coupled to the gas tank such that said positioning leg of said tag holder is adapted to be in contact with the gas tank, said slot is approximately perpendicular to the longitudinal axis of the gas tank.

6. An RFID tag positioning system as in claim 5, further comprising an RFID tag having an antenna, said RFID tag disposed in said slot of said tag holder wherein said antenna is approximately perpendicular to the longitudinal axis of the gas tank.

7. An RFID tag positioning system as in claim 5, wherein said tag holder comprises a material selected from the group consisting of rubber, fiberglass, plastics, wood, cloth, and combinations thereof.

8. A radio frequency identification (RFID) tag positioning system, comprising:

a tag holder transparent to electromagnetic energy, said tag holder including a first region having a slot extending from an edge of said first region, said tag holder including a second region extending from said first region, said second region including a positioning leg; and an RFID tag having an antenna, said RFID tag disposed in said slot of said tag holder wherein, when said tag holder is adapted to be retained adjacent a filling fixture of a gas tank with said positioning leg adapted to be in contact with the gas tank so that said slot is approximately perpendicular to a longitudinal axis of the gas tank, said antenna is approximately perpendicular to the longitudinal axis of the gas tank.

9. An RFID tag positioning system as in claim 8, further comprising a collar coupled to said tag holder and adapted to be attachable to the gas tank.

10. An RFID tag positioning system as in claim 9, wherein said collar is adjustable in size.

11. An RFID tag positioning system as in claim 8, wherein said tag holder comprises a material selected from the group consisting of rubber, fiberglass, plastics, wood, cloth, and combinations thereof.

* * * * *